June 13, 1967 A. W. AMACHER 3,325,680
AUTOMATIC HEADLIGHT DIMMING SYSTEM FOR INTERRUPTING
THE CONNECTION OF THE VOLTAGE SOURCE TO
THE BRIGHT FILAMENTS ONLY
Filed Oct. 1, 1964
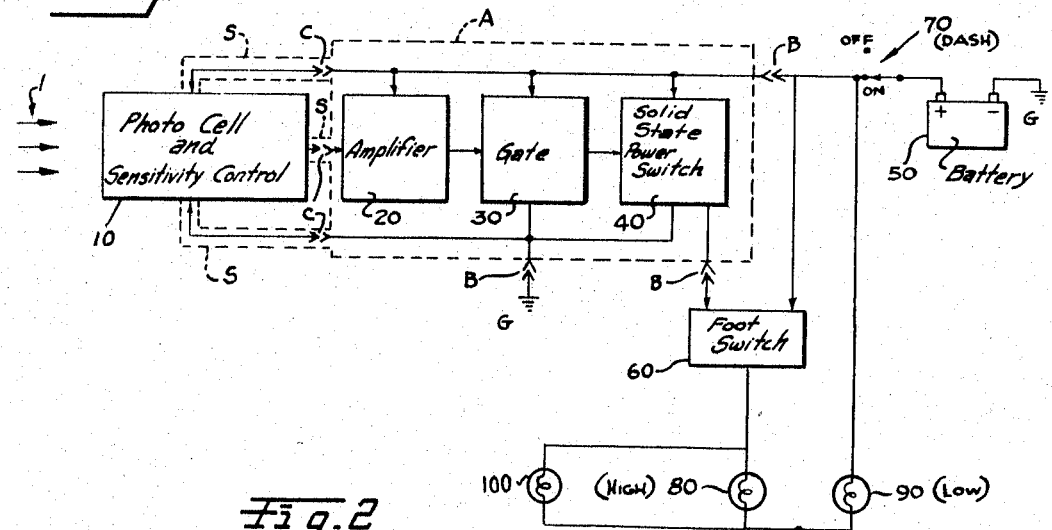
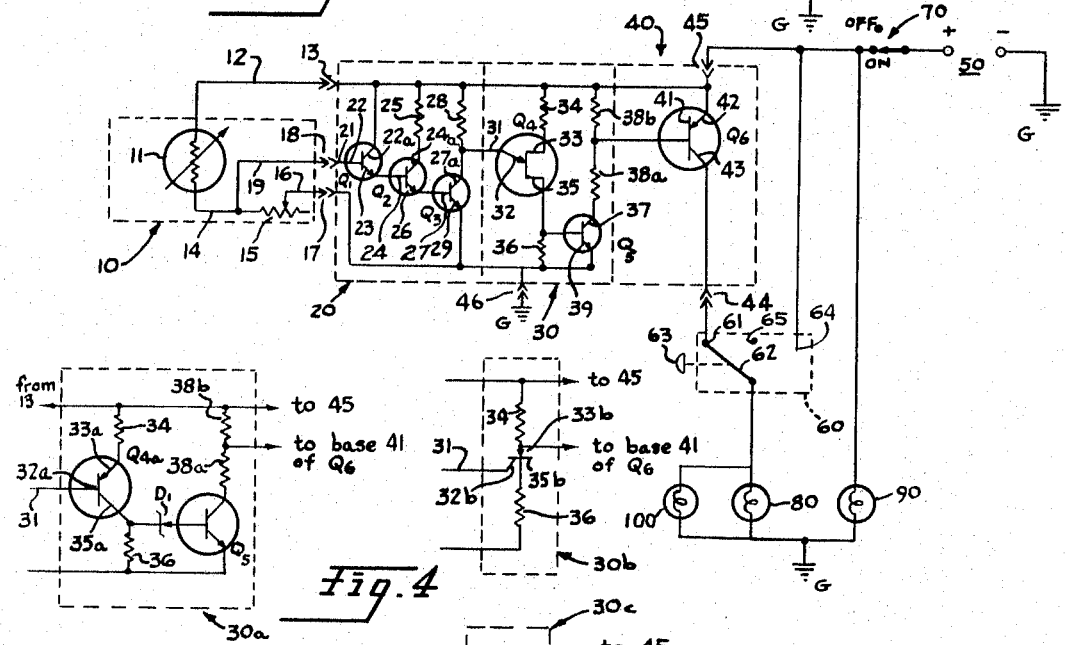
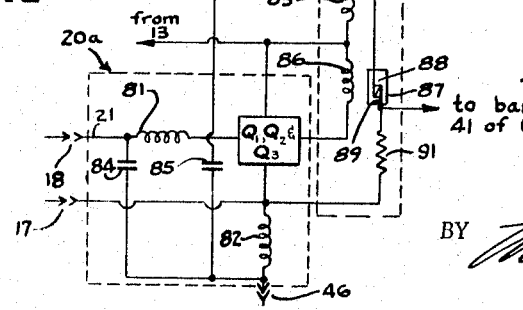
INVENTOR
ARTHUR W. AMACHER
BY
ATTORNEYS 3,325,680
AUTOMATIC HEADLIGHT DIMMING SYSTEM FOR INTERRUPTING THE CONNECTION OF THE VOLTAGE SOURCE TO THE BRIGHT FILAMENTS ONLY
Arthur W. Amacher, 718 Cawood, Lansing, Mich. 48915
Filed Oct. 1, 1964, Ser. No. 400,649
11 Claims. (Cl. 315—82)

This invention relates to automatic means for dimming the headlights of a motor vehicle, and more particularly to a headlight dimming system of the type employing photosensitive detector means acting in response to a selected level of incident light on the detector to automatically dim the headlights of a vehicle equipped with the detector means.

Most modern vehicles are equipped with headlights having multiple filaments and/or separate lamps so arranged as to direct the light beams therefrom onto different portions of a roadway in front of the vehicle, the headlights being referred to as the high beams and/or low beams according to the character thereof. In a typical headlight system, operation of the dash switch causes the low beam filaments to be continuously energized, while the high beam filaments are manually turned on or off by a conventional type of floor switch.

In the interest of preventing safety hazards to both the driver of an oncoming vehicle, due to the blinding effect of the high beams of an approaching vehicle, and to the operator of that vehicle himself, due to the distraction of operating the foot switch to manually dim his lights, it has been proposed heretofore to provide a system for automatically dimming the high beams in response to light rays from an oncoming car, as well as in a lighted area, such as in a city, where there is a sufficient amount of ambient light for safe driving conditions without the necessity of having the high beams on. Such prior art systems are generally inadequate for a variety of reasons; such as being bulky, complex, slow-acting, and so generally unreliable as to negate their acceptance by the general public. In adition, many of the prior art systems do not have any provision for enabling the driver to override the automatic system when he is not satisfied by its selection of high or low beams.

The present invention provides an automatic headlight dimming system which overcomes all of the problems and faults of the earlier systems. It is sufficiently sensitive to dim the headlights at the desired light level, and at the same time is simple yet rugged, compact, fast-acting, and is stable over a wide range of operating voltages. It employs relatively simple, inexpensive components, has no warm up delay or temperature sensitivity, and is extremely reliable. It is adapted for ready installation and easy interconnection with existing headlight energizing circuits, is easily serviced, and is energized directly from the vehicle battery, requiring no additional power supply means.

I have pointed out certain of the features, objects, and advantages of my invention in the foregoing statements. These and other objects and purposes will become increasingly apparent from the following description and the accompanying drawings wherein:

FIGURE 1 is a schematic block diagram illustrating thet headlight dimmer system of the present invention and particularly illustrating the major components in this system.

FIGURE 2 is a schematic wiring diagram illustrating the preferred embodiment of the headlight dimmer system of the present invention utilizing a unijunction transistor in the gate circuit.

FIGURES 3, 4 and 5 are schematic wiring diagrams particularly illustrating other gate circuit embodiments which can be used in the headlight dimmer system of the present invention.

Referring to FIGURE 1, a block diagram of the headlight dimmer system is shown. Light, for example, from the headlights of an oncoming vehicle, as indicated by lines 1, strikes a first network 10 including a photocell or other light sensitive device and a sensitivity control means as will be explained hereafter. The electrical output of network 10 is applied to amplifier means 20 and the electrical output of the amplifier means 10 is applied to a gate means 30, the output of which controls a solid state power or line switch 40. The headlight system includes a conventional vehicle battery or other direct current voltage source 50, a foot operated dimmer switch 60, a pilot light 100, off and on high beam or "bright" filaments 80 and on low beam or "dim" filaments 90.

As shown in FIGURE 1, the broken lines define a support or housing for a second network A including the amplifier means 20, gate means 30, and solid state power switch 40. The network A includes plug type or other suitable connectors as indicated by B, whereby the compact unit comprised by that network may be readily installed in vehicles.

Shielded cables S are used to couple the network 10 to the network A through connection means C, to prevent extraneous noise pulses from interfering with normal operation. The three cables shown may be installed as one cable having three conductors therein.

Having generally described the headlight dimmer system of the present invention, FIGURE 2 shows a detail circuit diagram of the preferred form of the dimmer system. Network 10 includes a photocell or other light sensitive device 11 having a line 12 connecting one side thereof to the positive side of the voltage source 50 through connection means 13, and a line 14 connecting the other side of the photocell 11 to a sensitivity controlling rheostat 15. The wiper of rheostat 15 is connected by line 16 through connection means 17 to the negative side of the voltage source 50 or to ground G, whereby the photocell 11 and rheostat 15 forms a voltage divider network. The output of the divider network is tapped off through connection means 18 by a line 19 connected to line 14 and to the input line 21 of the amplifier means 20.

Amplifier means 20 includes transistors Q1, Q2 and Q3, shown as NPN types, which constitute direct coupled current amplifiers for amplifying minute variations in current flowing through line 21 coupled to the base 22 of transistor Q1. The collector 22a of transistor Q1 has a direct connection with the positive side of voltage source 50, and the emitter 23 of transistor Q1 has a direct connection to the base 24 of transistor Q2. The collector 24a of transistor Q2 connects through resistor 25 to the positive side of the voltage source 50, and the emitter of transistor Q2 has a direct connection to the base 27 of transistor Q3. The collector 27a of transistor Q3 connects through resistor 28 to the positive side of the voltage source 50, and emitter 29 connects to the negative side of the voltage source 50 or to ground G. The output of the amplifier means 20 is taken from the junction of resistor 28 and the collector 27a of Q3 on line 31.

Gate means 30 includes a unijunction transistor Q4 having the emitter 32 connected to line 31, a first base 35 connected to the base of a transistor Q5 and through resistor 36 to ground and a second base 33 connected through resistor 34 to the positive side of the voltage source 50. The collector 37 of transistor Q5 connects through resistors 38a and b to the positive side of voltage source 50, and emitter 39 connects to ground.

The solid state power switch 40 includes a solid state power transistor or line switch Q6, shown as a PNP type, with its base 41 connected to the junction of resistors 38a and b. Emitter 42 of transistor Q6 connects to the positive side of voltage source 50, and the collector 43 of the transistor Q6 connects through a connector 44 to a contact 61. It is to be noted that all of the components previously described as being connected to the positive side of the power supply 50 are, in fact, coupled together and to the positive battery line through a common connection means 45. Similarly, all of the connections described as going to ground G or to the negative side of the power supply 50 are made through a common connection means 46.

One form of a foot operated switch 60 is schematically shown in FIGURE 2. Switch 60 includes the contact 61, a movable contact 62 operated by a foot button 63 and a contact 64 connected to the positive side of power source 50 to provide an override switch means for bypassing the automatic dimmer operation of networks 10 and A. A rest position 65 is provided so that only the low beam 90 is operative in this position.

The preferred kinds and values of the components in the preferred circuit illustrated in FIGURE 2 are:

| | |
|---|---|
| 11 | No. 8143. |
| 15 | 500,000 ohms. |
| Q1 | No. 2N708. |
| Q2 | No. 2N708. |
| Q3 | No. 2N388. |
| Q4 | No. 2N2160. |
| Q5 | No. 2N696. |
| Q6 | No. 2N278. |
| 25 | 620 ohms. |
| 34 | 430 ohms. |
| 28 | 560 ohms. |
| 38a | 75 ohms. |
| 38b | 33 ohms. |

The operation of the circuit shown in FIGURE 2, with headlight switch 70 closed (on) and the foot switch in the condition shown, is as follows: When photocell 11 is in darkness, the resistance thereof is high and there is not enough current drawn through the base of transistor Q1 to energize the amplifier means 20 consisting of transistors Q1, Q2 and Q3. Since the transistor Q3 is not conducting, current is allowed to flow from emitter 31 of the unijunction transistor Q4 through resistor 28. Unijunction transistor Q4 snaps on and draws current from the base of transistor Q5, turning on transistor Q5 and lowering the potential on the base of the power switch Q6, whereby Q6 is turned on to complete the power circuit to high beam or "bright" filaments 80.

When light from the headlights of an oncoming vehicle, which can be termed incident light, falls on photocell 11, the amplifiers Q1, Q2 and Q3 conduct current. With Q3 conductive, emitter 32 of unijunction transistor Q4 is shorted to ground and the unijunction transistor Q4 is shut off. Therefore, the current flowing through transistor Q5, resistor 38a, and base 41 of transistor switch Q6 is turned off, the action being the reverse of that described for the "dark" condition, whereby Q6 is turned off, blocking current flow to the "bright" filaments.

FIGURE 3 shows a gate circuit which may be substituted for the gate circuit shown in FIGURE 2. The gate circuit 30a includes a thyristor Q4a having base 32a connected to the amplifier output line 31. Emitter 33a connects through resistor 34 to the positive side of power source 50, and collector 35a connects through resistor 36 to ground. The collector 35a of Q4a is also connected through a zener diode D1 to the base of transistor Q5. The remaining connections follow those in FIGURE 2.

The operation of the system including the gate circuit 30a is as follows: The operation as explained for FIGURE 2, up to unijunction transistor Q4 is the same. With the photocell 11 in the dark, thyristor Q4a is snapped into conduction and the resultant voltage drop across resistor 36 exceeds the zener voltage of diode D1. Diode D1 then conducts drawing current through the base of transistor Q5 to turn on power switch transistor Q6 and complete the "bright" filament circuit in the same manner described for the circuit of FIGURE 2.

With light incident on photocell 11, amplifiers Q1, Q2 and Q3 conduct current thereby causing thyristor Q4a to snap to a non-conductive state, and thereby cause transistor Q5 and power switch Q6 to return to a non-conductive state to therefore turn the "bright" filaments off. It is to be pointed out that thyristor Q4a has some current leakage before it snaps into conduction, which could cause the rest of the system to conduct ahead of time. The reverse biased zener diode D1 counteracts this tendency.

FIGURE 4 shows another gate circuit 30b which can be substituted for the gate 30 of FIGURE 2. Gate 30b includes a silicon-controlled rectifier (SCR) having the trigger 32b connected to amplifier output line 31, anode 33b connected through resistor 34 to the positive side of power source 50, and cathode 35b connected through resistor 36 to ground. In this embodiment, the base 41 of power switch Q6 is connected to the anode 33b of the SCR. The SCR is of the gate turn-off type, that is, it can be turned off by applying a reverse current to the gate 32b. Resistor 36 acts as a cathode bias resistor for the SCR.

The operation is similar to that previously described in that when photocell 11 is in darkness, amplifiers Q1, Q2 and Q3 are non-conductive therefore, current flows through resistor 28 (see FIGURE 2) to trigger 32b, thus turning on the SCR. Current is allowed to flow through resistor 36, lowering the potential on the base 41 of power switch transistor Q6 turning on Q6 to pass current to the "bright" filaments. As before, when light falls on photocell 11, amplifiers Q1, Q2 and Q3 conduct. This makes trigger 32b more negative than cathode 35b and the SCR is turned off. Current flow to the base of power switch transistor Q6 is stopped thereby turning off transistor Q6 and the "bright" filaments 80.

FIGURE 5 shows another gate 30c, which may be substituted for the gate 30 of FIGURE 2, and a modified form 20a of the amplifier.

Referring to FIGURES 2 and 5, the modified amplifier 20a includes a choke 81 in line 21 to the base of transistor Q1, a choke 82 between the emitter 29 of transistor Q3 and ground G, and a choke 83 between the positive side of voltage source 50 and the connection to the collectors of transistors Q1, Q2 and Q3. A condenser 84 is connected from the photocell side of choke 81 to ground connection 46, and a condenser 85 in connected to choke 83 and to ground G. The chokes and condensers are used to damp out spurious oscillations which tend to make the operation of the automatic dimmer system unstable.

A coil 86 for a sealed reed type switch 87 is connected between choke 83 and the collector 27 of transistor Q3 replacing resistor 28 of FIGURE 2. The contacts 88 and 89 of the sealed reed switch 87 are connected between emitter 42 and base 41 of power switch transistor Q6, replacing resistor 38b of FIGURE 2. A resistor 91 is connected between base 41 of transistor Q6 and emitter 29 of transistor Q3. It is preferred that the resistance 91, have a value of 75 ohms.

Operation of FIGURE 5 is as follows: When photocell 11 is in darkness, its resistance is high, therefore, amplifiers Q1, Q2 and Q3 are non-conductive. With no current flowing through coil 86, reed switch 87 contacts 88 and 89 are open, and the "bright" filaments are allowed to remain on through power switch transistor Q6, which is in a conductive state.

When oncoming headlights fall on photocell 11, the resistance thereof decreases and amplifiers Q1, Q2 and Q3 conduct thereby causing current flow in coil 86 to close contacts 88 and 89, shorting base 41 to emitter 42 of power switch transistor Q6, shutting off power switch transistor Q6 and thereby turning the "bright" filaments off.

The circuit of FIGURE 5 may be modified in a manner not shown in the drawings to provide the reverse action of the operation thereof. The wiper of rheostat 15 would be connected to the positive side of voltage source 50 through connection means 13 and choke 83. Line 12 is connected to ground through connection means 17 and choke 82, contacts 88 and 89 connected between base 41 and collector 43 of power switch Q6. Resistor 91 is deleted and a resistor is connected between base 41 of Q6 and the positive side of voltage source 50.

The operation of the modification of FIGURE 5 is as follows: When photocell 11 is in darkness, the resistance thereof is high and isolates the base of transistor Q1 from ground. This allows current to activate transistors Q1, Q2 and Q3. Current flows in coil 86 closing contacts 88 and 89 to allow base current to flow in power switch Q6, therefore allowing sufficient current to flow through the collector-emitter circuit of Q6 to turn on the "bright" filaments.

When the photocell is in the light of oncoming headlights, the resistance is low, grounding the base of transistor Q1, therefore causing transistors Q1, Q2 and Q3 to be non-conductive. Current ceases to flow in coil 86 and causes contacts 88 and 89 to open, thereby stopping current flow in solid-state power switch Q6 and the "bright" filaments.

While certain specific embodiments of the invention have been disclosed in the foregoing description, it will be understood that various modifications within the spirit of the invention may occur to those skilled in the art. Therefore it is intended that no limitations be placed on the invention except as defined by the scope of the appended claims.

I claim:

1. An automatic vehicle headlight dimmer control system comprising a voltage source, "bright" and "dim" headlight filaments, a light sensitive device responsive to changes in incident light received thereby, amplifier means for amplifying electrical variations in said light sensitive device, gate means responsive to the output of said amplifier means, circuit connection means for connecting said voltage source to said "bright" and "dim" headlight filaments, solid state switch means in said circuit connection means for interrupting the connection of said voltage source to said "bright" filaments only, said switch means being responsive to a condition of said gate means whereby the amount of incident light falling on said light sensitive device controls the switching on and off of said voltage source to said "bright" filaments only.

2. An automatic vehicle headlight dimmer control system comprising a voltage source for "bright" headlight filaments, circuit means including a light sensitive device responsive to changes in incident light received thereby, solid state switch means in a line circuit connecting said voltage source to said "bright" headlight filaments only, said solid state switch means being responsive to the output of said circuit means for switching on and off of said voltage source to said "bright" headlight filaments only.

3. An automatic vehicle headlight dimmer control system comprising a voltage source, "bright" and "dim" headlight filaments, a light sensitive device responsive to changes in incident light received thereby, amplifier means for amplifying electrical variations of said light sensitive device, gate means responsive to the output of said amplifier means, circuit connection means for connecting said voltage source to said "bright" and "dim" headlight filaments, solid state switch means in a first line of said circuit connection means for switching on and off said voltage source to said "bright" filaments only, said gate means including a semi-conductor trigger device responsive to the output of said amplifier means, whereby the amount of incident light falling on said light sensitive device controls said gate means and said gate means thereby controls the switching on and off of said solid state switch means resulting in the switching on and off of said voltage source to said "bright" filaments only.

4. An automatic vehicle headlight dimmer control system as in claim 3 and wherein said light sensitive device has associated therewith an adjustable control means for controlling the sensitivity of said device.

5. An automatic vehicle headlight dimmer control system as in claim 3 and wherein said circuit connection means includes a manually operated switch means, said manually operated switch means including a first switch in said first line, and further including a second switch for selectively connecting a second line of said circuit connection means to said "bright" filaments only, said second line connecting said voltage source to said second switch.

6. An automatic vehicle headlight dimmer control system as in claim 3, and wherein said amplifier means includes a plurality of direct coupled solid-state devices.

7. An automatic vehicle headlight dimmer control system as in claim 3, and wherein said semi-conductor trigger device includes a unijunction transistor, the emitter of said unijunction transistor having the output of said amplifier means applied thereto.

8. An automatic vehicle headlight dimmer control system as in claim 3, and wherein said semi-conductor trigger device includes a thyristor.

9. An automatic vehicle headlight dimmer control system comprising a first network including a light sensitive device and sensitivity control device; a second network responsive to a condition of said first network and including an amplifier means, a gate means, and a solid state power switch; a third network including "bright" and "dim" headlight filaments, and a manually operated switch means; and a voltage source for said networks, said gate means including a sealed reed electromagnetically operated switch, said switch controlling the input to said solid state power switch, whereby the amount of incident light falling on said light sensitive device controls the switching on and off of said voltage source to said "bright" filaments only.

10. An automatic vehicle headlight dimmer control system as in claim 9 and wherein said amplifier includes a plurality of solid-state direct coupled transistors.

11. An automatic vehicle headlight dimmer control system comprising a first network including a light sensitive device; a second network responsive to a condition of said first network including an amplifier means coupled to said first network, a unijunction transistor gate means, and a solid state power switch means; a third network including "bright" and "dim" headlight filaments coupled to said power switch; and a voltage source for said networks, said unijunction transistor being coupled between the amplifier means and the power switch means whereby the amount of incident light falling on said light sensitive device controls the switching on and off of said power switch to control the switching on and off of said voltage source to said "bright" filaments only.

References Cited

UNITED STATES PATENTS

| 2,959,709 | 11/1960 | Vanaman et al. | 315—83 |
| 2,962,628 | 11/1960 | McIlvaine | 315—83 |
| 3,209,154 | 9/1965 | Maring | 307—88.5 |
| 3,219,910 | 11/1965 | Klimo | 307—88.5 |
| 3,225,341 | 12/1965 | Devine | 307—88.5 |
| 3,253,163 | 5/1966 | Konopa | 307—88.5 |

OTHER REFERENCES

Bosso, Preset-Reset Thyristor Counter, RCA Technical Notes, RCA TN No. 445, January 1961.

JAMES W. LAWRENCE, *Primary Examiner.*

R. JUDD, *Assistant Examiner.*